(12) United States Patent
Takimoto et al.

(10) Patent No.: US 9,410,818 B2
(45) Date of Patent: Aug. 9, 2016

(54) NAVIGATION DEVICE

(71) Applicant: MITSUBISHI ELECTRIC CORPORATION, Tokyo (JP)

(72) Inventors: Yasuaki Takimoto, Tokyo (JP); Takeshi Mitsui, Tokyo (JP); Takayoshi Chikuri, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/888,985

(22) PCT Filed: May 22, 2013

(86) PCT No.: PCT/JP2013/064250
§ 371 (c)(1),
(2) Date: Nov. 4, 2015

(87) PCT Pub. No.: WO2014/188536
PCT Pub. Date: Nov. 27, 2014

(65) Prior Publication Data
US 2016/0069702 A1    Mar. 10, 2016

(51) Int. Cl.
*G01C 21/26* (2006.01)
*G01C 21/36* (2006.01)

(52) U.S. Cl.
CPC ........ *G01C 21/3644* (2013.01); *G01C 21/3647* (2013.01)

(58) Field of Classification Search
CPC .................. G01C 21/3644; G01C 21/3647
USPC .......................................................... 701/519
See application file for complete search history.

(56) References Cited

U.S. PATENT DOCUMENTS 6,163,750 A    12/2000  Nojima
9,082,239 B2 *  7/2015  Ricci ..................... H04W 48/04

FOREIGN PATENT DOCUMENTS

| JP | 9-304102 A | 11/1997 |
| JP | 10-281794 A | 10/1998 |
| JP | 2000-132798 A | 5/2000 |
| JP | 2009-198267 A | 9/2009 |
| JP | 2010-8144 A | 1/2010 |

* cited by examiner

*Primary Examiner* — Richard Camby
(74) *Attorney, Agent, or Firm* — Birch, Stewart, Kolasch & Birch, LLP

(57) ABSTRACT

According to a navigation device of the invention, at the time of performing turning guidance for a user who drives a vehicle, it is possible to perform the guidance in a way easy-to-understand for the user. Namely, a presentation of a preceding vehicle is made using an actual image or a graphic image of a vehicle that is the same as the actually seen vehicle, so that the user who drives the vehicle in traveling will understand that he/she only has to follow the preceding vehicle actually traveling ahead. This results in such route guidance that does not cause misunderstanding of a turning point and is very easy-to-understand.

6 Claims, 7 Drawing Sheets

FIG.4
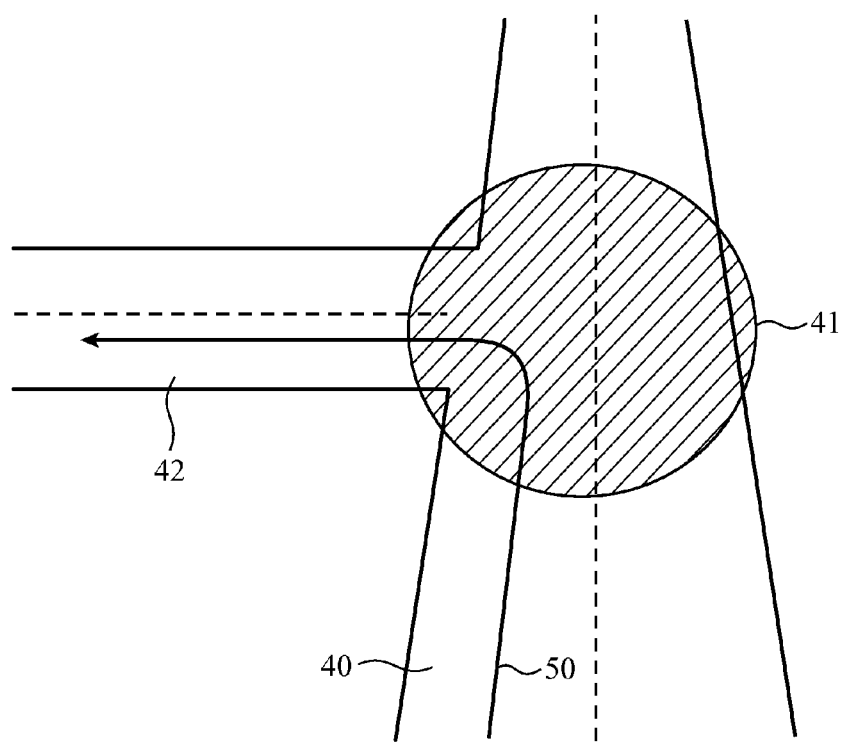
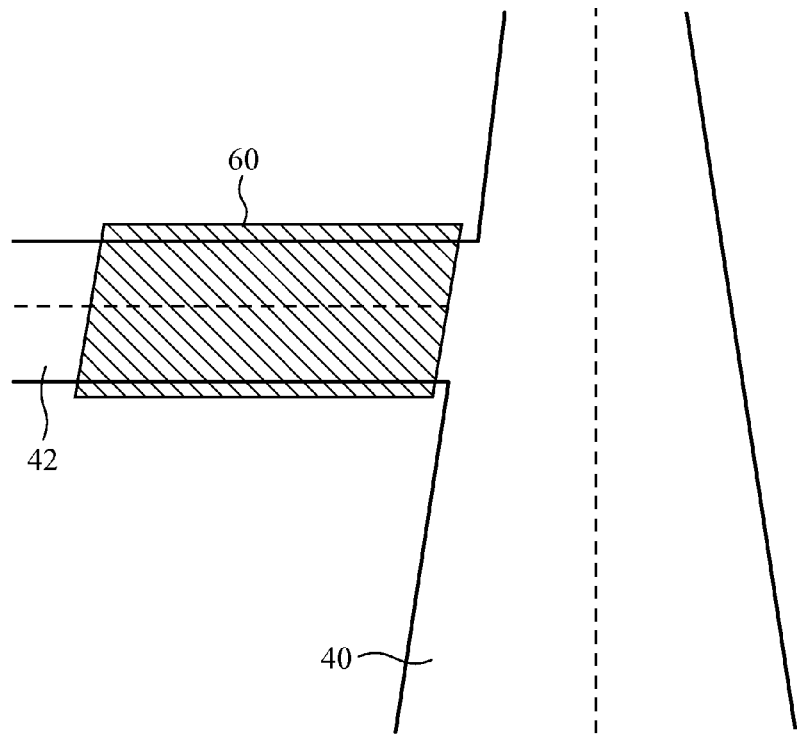

FIG.7
(a)
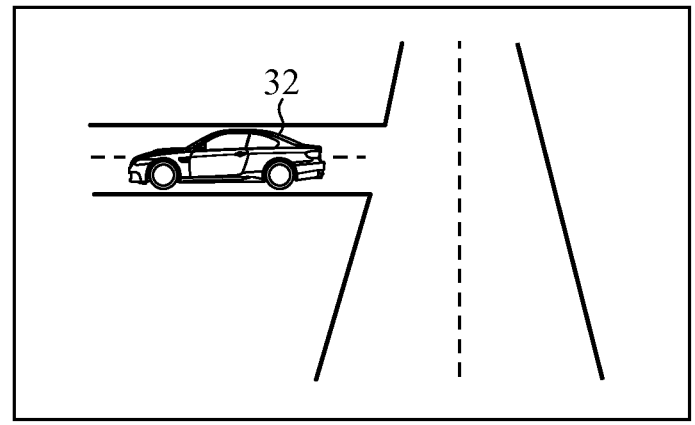
(b)
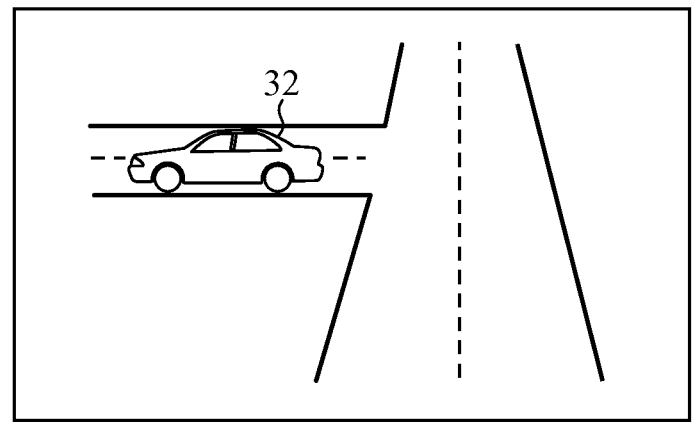
(c)
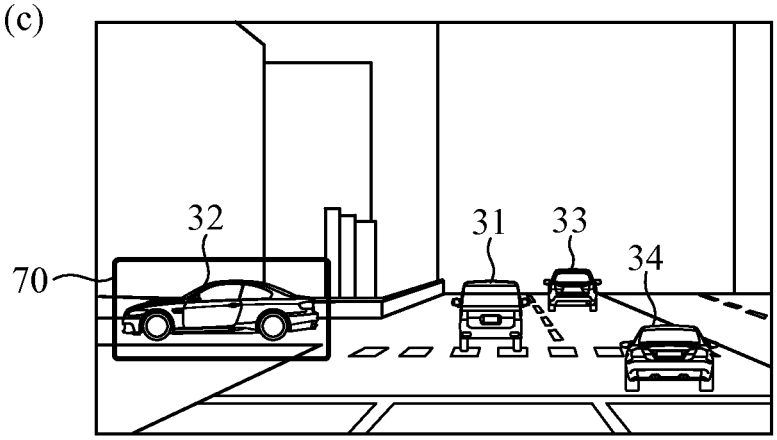

NAVIGATION DEVICE

TECHNICAL FIELD

The present invention relates to a navigation device that performs route guidance for a user.

BACKGROUND ART

In general, according to a navigation device in a moving object such as a vehicle, that performs route guidance up to a user-set destination, etc., such a presentation is provided to the user when the object reaches at a predetermined distance before a turning point, in which, with a voice guidance, for example, of "500 meters ahead, turn left" or the like, a left-turn arrow is displayed at the turning point on a map displayed on the navigation device, or a detail picture at the turning point is displayed with a display of an arrow in a traveling direction after turning.

However, in such guidance by the navigation device, the expression of "500 meters ahead, turn left", for example, causes a difference in feeling among the users. Further, the time until the vehicle (moving object) reaches the turning point differs depending on its speed. Thus, it has been difficult for the user to exactly recognize a point where turning is to be taken (for example, left-turning is to be taken). As a result, the user turns to a wrong route in some cases when turn-permissible intersections exist successively.

With respect to such a problem, in Patent Document 1, for example, there is described that: movements of vehicles (VA, VB) registered in a navigation server (center) are recognized by the server (center); and in the case where the other vehicle VB that exists ahead of the specific vehicle VA in its traveling direction, turns right/left at the same turning point as that of the specific vehicle, guidance data corresponding to the movement of the other vehicle VB is transmitted to the specific vehicle VA, so that such a voice guidance is performed, for example: "Next intersection, go in the rightward direction. That is a direction in which the black sedan ahead in the traveling direction turns right. The distance between that vehicle and the intersection is 30 meters".

CITATION LIST

Patent Document

Patent Document 1: Japanese Patent Application Laid-open No. 2000-132798

SUMMARY OF THE INVENTION

Problems to be Solved by the Invention

However, since the navigation server (center) is generally established on every car-maker basis, it is typically unable to recognize a movement with respect to the vehicle of another car maker. As a result, according to the technology as shown, for example, in Patent Document 1, a vehicle can not be used for guidance unless otherwise registered beforehand in the navigation server (center). Thus, there is a problem that, even if a vehicle exists that is placed ahead of a host vehicle and that turns right/left at a turning point to be on the same route, it is not used for guidance unless otherwise registered in the server (center).

This invention has been made to solve the problem as described above, and an object thereof is to provide a navigation device that performs using a vehicle traveling ahead of a user, route guidance in an easy-to-understand manner for the user, without by way of the navigation server (center).

Means for Solving the Problems

To accomplish the above purpose, according to the invention, there is provided a navigation device which is provided with a route guider that generates route information on the basis of position information of a host vehicle and map data, to thereby perform route guidance for a user who drives the host vehicle, said navigation device characterized by comprising: a route identifier that extracts a turning position of the host vehicle on the basis of the route information acquired from the route guider, to thereby prepare, as a recognition region, a predetermined range of route before and/or after the turning position, and that determines a preceding vehicle traveling on a route that is the same as that of the host vehicle; a vehicle recognizer that acquires the recognition region from the route identifier to thereby detect within the recognition region, a nearby vehicle with respect to the host vehicle on the basis of an image captured ahead of the host vehicle in traveling, and that informs of a vehicle trajectory and a vehicle image of the thus-detected nearby vehicle, as a recognition result; and a guide information generator that generates preceding vehicle information for providing to the user a presentation of the preceding vehicle determined by the route identifier; wherein the route identifier determines the preceding vehicle from the nearby vehicle traveling on the route that is the same as that of the host vehicle, on the basis of the recognition result acquired from the vehicle recognizer; and wherein the route guider, at the time of performing the route guidance, provides the presentation of the preceding vehicle to the user by a predetermined presentation method, on the basis of the preceding vehicle information generated by the guide information generator. Effect of the Invention According to the invention, at the time of performing turning guidance for a user who drives a vehicle, it is possible to perform the guidance in a way easy-to-understand for the user.

BRIEF DESCRIPTION OF THE DRAWINGS

FIGS. 4(a) and 4(b) are schematic diagrams for illustrating a recognition region in the case where the host vehicle turns left at a turning point.

FIGS. 7(a) to 7(c) are diagrams showing examples of guide display screens according to respective Guide Patterns 1 to 3.

MODES FOR CARRYING OUT THE INVENTION

Hereinafter, embodiments of the present invention will be described in detail with reference to the drawings.

Embodiment 1

Figure 1:
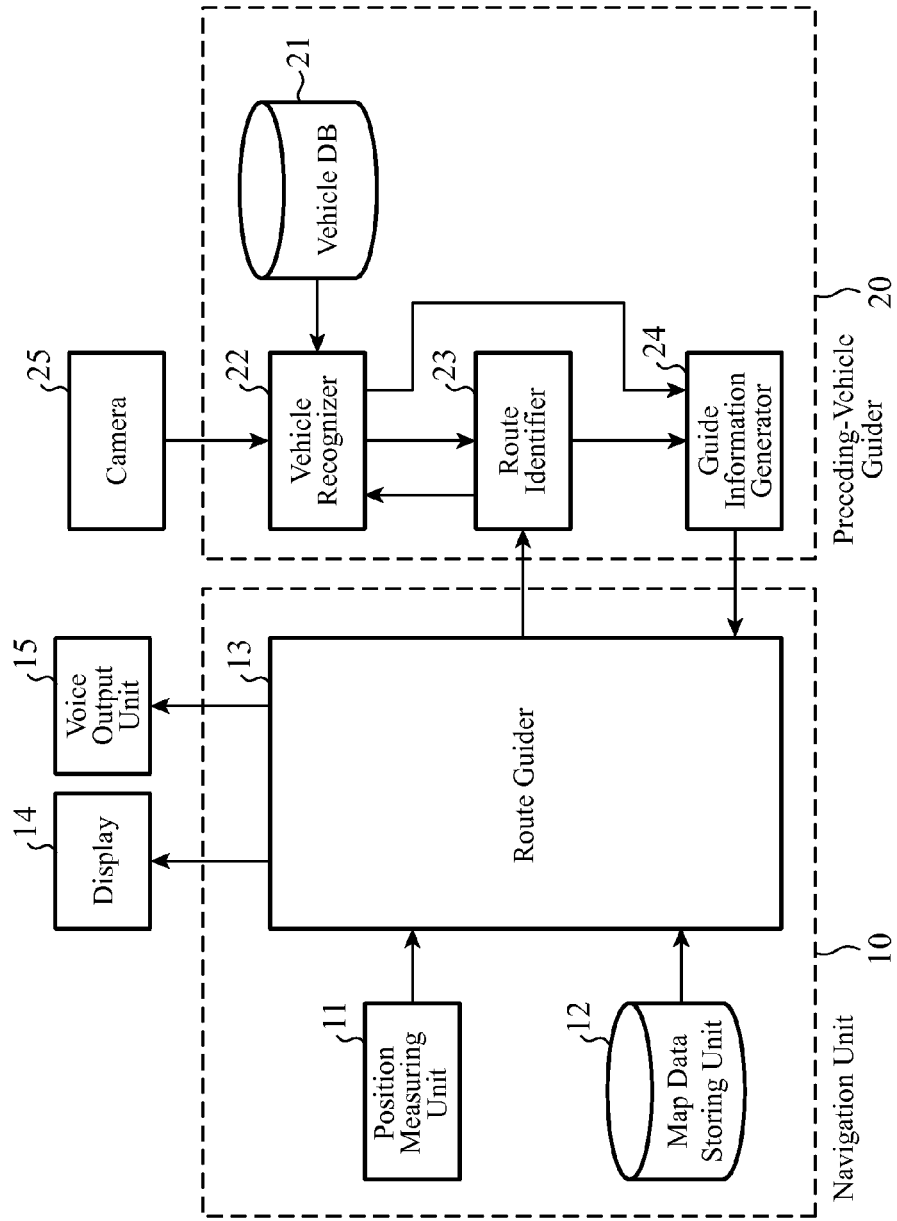
FIG. 1 is a block diagram showing a configuration of a navigation device according to Embodiment 1.

FIG. 1 is a block diagram showing a configuration of a navigation device according to Embodiment 1 of the invention. This navigation device is constituted with such a configuration in which a preceding-vehicle guider 20 is added to a configuration of a conventional navigation unit 10 that generates route information on the basis of position information of a host vehicle and map data, to thereby perform route guidance for a user who drives the host vehicle, or likewise.

It should be noted that, in Embodiment 1, description will be made assuming that the navigation device is a navigation device for on-vehicle use that is equipped in a vehicle; however, the navigation device is not limited to the navigation device for on-vehicle use, and may also be applied as a navigation device that is to be used by being carried into a vehicle, such as a portable navigation device, etc.

The navigation unit 10 includes a position measuring unit 11, a map data storing unit 12 and a route guider 13, and generates route information up to a destination on the basis of the host-vehicle position information and the map data, to thereby perform route guidance for the user, for example, by displaying an image on a display 14 and/or outputting a voice from a voice output unit 15 such as a speaker, etc. The configuration and operations of the navigation device 10 are the same as those of a conventional navigation device, so that their detailed description is omitted here.

The preceding vehicle guider 20 includes a vehicle database (vehicle DB) 21, a vehicle recognizer 22, a route identifier 23 and a guide information generator 24, and receives the route information from the route guider 13 to determine, on the basis of that route information and an image captured ahead of the host vehicle in traveling by a camera 25, a precedent vehicle traveling on the same route as that of the host vehicle, followed by generating and outputting preceding vehicle information to the route guider 13.

Figure 2:
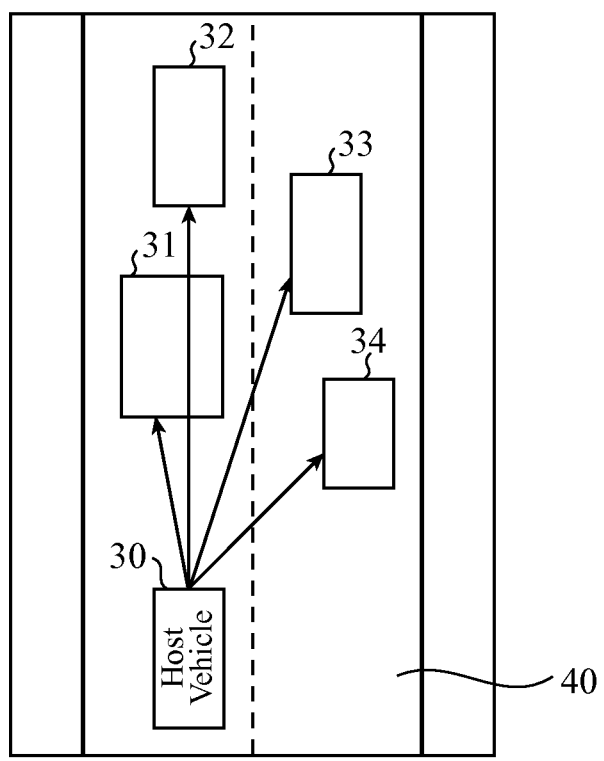
FIG. 2 is a schematic illustration diagram showing a state where a host vehicle equipped with the navigation device according to Embodiment 1 is traveling on a road.

FIG. 2 is a schematic illustration diagram showing a state where a host vehicle 30 equipped with the navigation device according to Embodiment 1 is traveling on a road 40.

The host vehicle 30 equipped with the navigation device is also equipped with the camera 25 for capturing a frontward view, and for example, when other four vehicles 31 to 34 are traveling ahead on the same road 40 as shown for example in FIG. 2, these nearby vehicles (the other four vehicles 31 to 34) are being captured by the camera 25.

Figure 3:
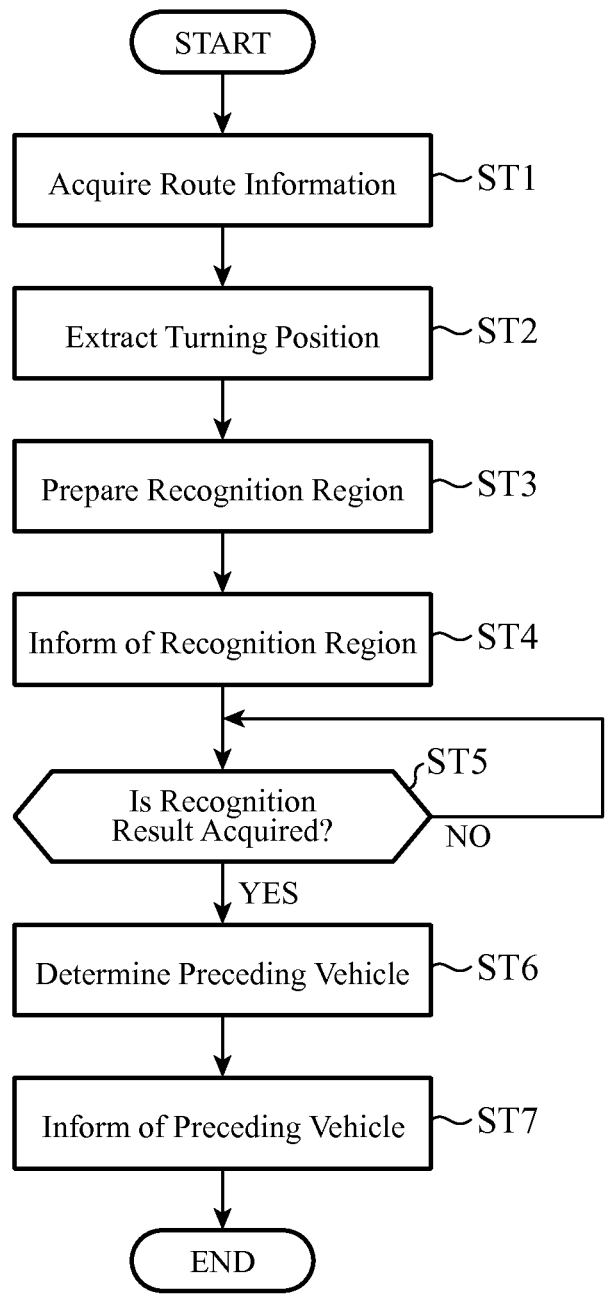
FIG. 3 is a flowchart showing processing in a route identifier.

FIG. 3 is a flowchart showing processing in the route identifier 23.

The route identifier 23, first of all, acquires the route information from the route guider 13 (Step ST1). Then, the route identifier extracts a turning position of the host vehicle on the basis of the acquired route information (Step ST2), and, when the host vehicle position in the information (including directions of the host vehicle [a direction in the horizontal plane and a direction as an inclination direction] other than the host vehicle position) reaches a point before the turning point and at a predetermined distance therefrom, it is placed in a preceding-vehicle search mode and informs the vehicle recognizer 22 of a recognition region (Steps ST3, ST4).

In this case, the recognition region is prepared by projecting a predetermined range of route before and/or after the turning position onto an image coordinate system using the host-vehicle position information (Step ST3). Then, the vehicle recognizer 22 is informed of the prepared recognition region (Step ST4). This produces an effect of reducing calculation volume related to vehicle recognition. Thus, in Embodiment 1, description has been made assuming that the recognition region is prepared; however, it is allowable not to prepare such a recognition region and instead to perform processing of vehicle recognition for the whole screen.

An example of the recognition region will be described using FIG. 2 and FIG. 4. FIG. 4 is schematic diagrams for illustrating the recognition region in the case where the host vehicle 30 turns left at a turning point 41.

While, in the state shown for example in FIG. 2, the host vehicle 30 traveling on the road 40 is capturing by the camera 25 the nearby vehicles 31 to 34, here is assumed that, as shown in FIG. 4, the host vehicle 30 is route-guided so as to turn left at the turning point 41 and then to travel on a road 42.

FIG. 4(a) is a schematic diagram showing a guide route 50 of the host vehicle 30, the road 40, the turning point 41 and the road 42 after the left turn, in the case where the host vehicle 30 traveling on the road 40 straightforward is going to turn left at the turning point 41 and then to travel on the road 42. Further, FIG. 4(b) is a schematic diagram showing a recognition region 60 in the state of FIG. 4(a).

In this case, as described above, when the host vehicle 30 reached a point before the turning point 41 and at a predetermined distance therefrom (such a point where normal turning guidance is performed, for example, a point 700 meters before the turning point, or the like), the route identifier 23 is placed in the preceding-vehicle search mode, and prepares the recognition region 60 shown in FIG. 4(b) followed by informing the vehicle recognizer 22 of that region (Steps ST3 and ST4 in FIG. 3).

Figure 5:
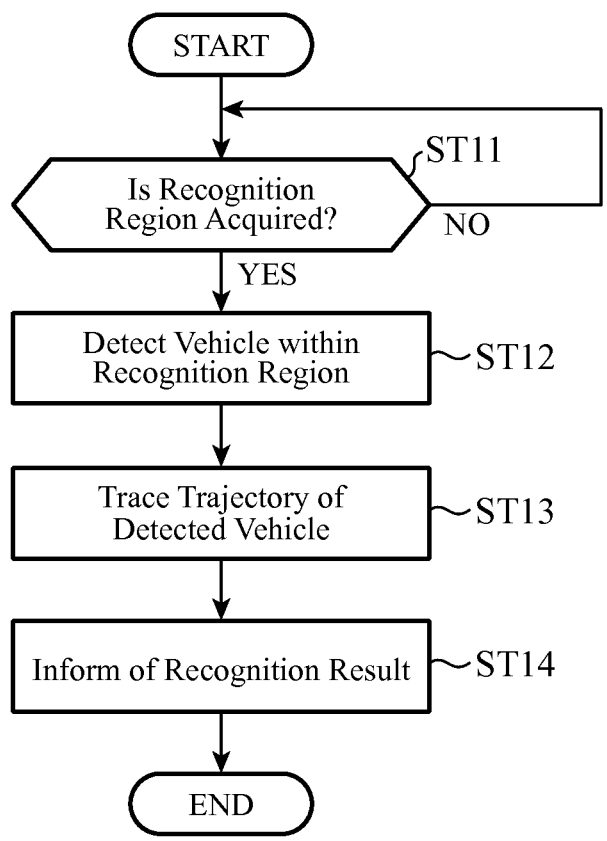
FIG. 5 is a flowchart showing processing in a vehicle recognizer.

FIG. 5 is a flowchart showing processing in the vehicle recognizer 22.

Upon acquiring the recognition region 60 from the route identifier 23 (in the case of "YES" in Step ST11), the vehicle recognizer 22 detects within the acquired recognition region 60, a vehicle portion (a portion that looks like a vehicle) on the basis of the image captured by the camera 25 ahead of the host vehicle 30 in traveling, to thereby detect a nearby vehicle (Step ST12), followed by tracing movement of that vehicle (Step ST13).

Figure 6:
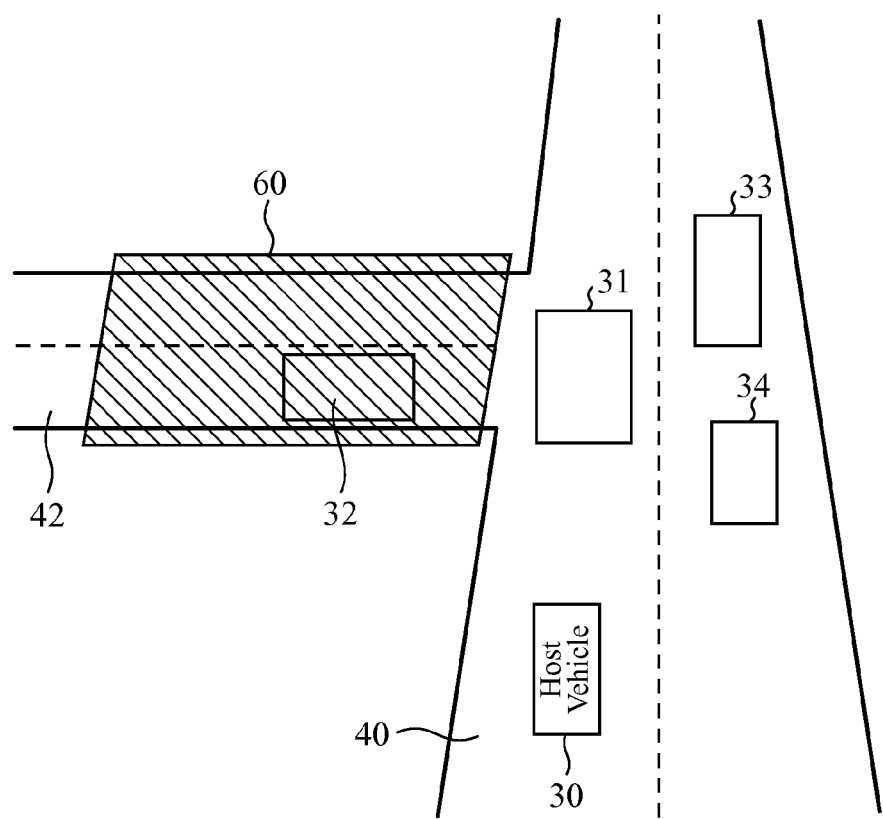
FIG. 6 is a diagram resulting from the state shown in FIG. 2, and showing roads on which respective nearby vehicles travel after passing the turning point.

FIG. 6 is a diagram resulting from the state shown in FIG. 2, and showing a state where the nearby vehicle 32 turns left at the turning point 41 to travel on the road 42, while the other nearby vehicles 31, 33 and 34 travel on the road 40 straightforward without change. In this case, when the host vehicle 30 reached a point before the turning point 41 and at a predetermined distance therefrom (for example, a point 700 meters before the turning point, or the like), the vehicle recognizer is informed of the recognition region 60 from the route identifier 23 (Step ST4 in FIG. 3).

As a result, the vehicle recognizer 22 detects from within the image acquired from the camera 25 equipped in the host vehicle 30, and within its acquired recognition region 60, the nearby vehicle 32 as a vehicle portion (a portion that looks like a vehicle) (Step ST12), followed by tracing the trajectory of the nearby vehicle 32 (Step ST13).

For detection of the vehicle portion, for example, a plurality of images captured from different directions for each vehicle type are prepared as the vehicle DB 21 in advance, and identification (template matching) is performed with the image acquired from the camera 25 that is used as a reference image to the images in the vehicle DB 21. This makes it possible to obtain a position and vehicle type of the vehicle in the image.

At this time, when identification is performed between a recognition result from a previous frame image and a recognition result from a current frame image, it is possible to trace a moving state of an identical type of vehicle. Here, in place of the template matching, another recognition method, such as a method using a HOG (Histogram of Oriented Gradient) feature amount and statistical learning, or the like, may be used.

Then, the vehicle recognizer 22 informs of the vehicle trajectory and vehicle image of the detected nearby vehicle 32 as a recognition result (Step ST14). More specifically, as a recognition result, the vehicle recognizer informs the route identifier 23 of the vehicle trajectory of the detected nearby vehicle 32, and informs the guide information generator 24 of the vehicle image of the nearby vehicle 32.

Processing after the route identifier 23 acquired the recognition result will be described with reference again to the flowchart shown in FIG. 3.

In the vehicle search mode, when acquired the recognition result (vehicle trajectory of the nearby vehicle 32) from the vehicle recognizer 22 (in the case of "YES" in Step ST5), the route identifier 23 converts based on the acquired recognition result, the respective positions in the vehicle trajectory from an image coordinate system to a route-information coordinate system, using the host-vehicle position information at the time corresponding to each of the positions.

Note that how to make this conversion could not be unambiguously determined at each time, and thus, for example, the conversion is performed with a restraint condition that each of the positions in the vehicle trajectory on the image coordinate system is placed in a horizontal plane including the host vehicle at the corresponding time. Likewise, using the inclination of the host vehicle, such a restraint condition may also be used that each of the positions on the image coordinate system has an inclination that is the same as the inclination of the host vehicle at the corresponding time, and is placed in a horizontal plane including the host vehicle. Instead, the conversion may also be performed using a map around the host vehicle, in such a manner that roads (candidates for the route) at around the host vehicle on the map are projected onto an image coordinate system using the host-vehicle position information corresponding to the respective positions, and the road that is nearest to the position information on the image coordinate system is selected thereamong.

The thus-obtained nearby vehicle trajectory after conversion and the route information of the host vehicle are compared with each other, to thereby determine the preceding vehicle from the nearby vehicle traveling on the road that is the same as (or similar to) that of the host vehicle (Step ST6).

Note that in the case shown in FIG. 6, the detected nearby vehicle 32 is directly determined as the preceding vehicle; however, in the case where a plurality of nearby vehicles, each traveling on the road that is the same as (or similar to) that of the host vehicle 30, are obtained, the nearby vehicle that is nearest to the host vehicle 30 is determined as the preceding vehicle. Namely, if the nearby vehicle 31 also turned left at the turning point 41 to travel on the road 42, the nearby vehicle 31 that is nearer to the host vehicle 30 is determined from the nearby vehicles 32 and 31, as the preceding vehicle.

The route identifier 23 informs the guide information generator 24 of the information related to the thus-determined preceding vehicle (Step ST7).

Then, the guide information generator 24 generates preceding vehicle information for providing a presentation of the preceding vehicle acquired from the route identifier 23 to the user (for using it for route guidance). Further, the route guider 13, at the time of performing route guidance, provides a presentation of the preceding vehicle to the user by a predetermined presentation method, on the basis of the preceding vehicle information generated by the guide information generator 24.

The generation and presentation method of the preceding vehicle information, which differs depending on a method of guidance, will be described below citing some examples (Guide Patterns 1 to 3).

FIG. 7 is diagrams showing examples of guide display screens according to respective Guide Patterns 1 to 3.

(1) Guide Pattern 1

The route guider 13 is beforehand provided with a function of displaying, as a graphic, a view of the turning position seen from before it.

To the route guider 13, the guide information generator 24 transmits the preceding vehicle information including the turning position and the vehicle image of the preceding vehicle. Note that the guide information generator 24 has received the vehicle image as the recognition result from the vehicle recognizer 22 (see, Step ST14 in FIG. 4).

Then, the route guider 13 provides a presentation to the user, on the basis of the turning position and the vehicle image of the preceding vehicle that are included in the preceding vehicle information, by displaying on the display 14, as a graphic, a view of the turning position seen from before it, and by displaying the vehicle image about the preceding vehicle determined by the route identifier 23 in a superimposed manner on a picture of the graphic. This is the predetermined presentation method according to Guide Pattern 1.

FIG. 7(*a*) is a diagram showing an example of a guide display screen when a presentation is made by displaying the vehicle image of the nearby vehicle 32 that is the preceding vehicle determined by the route identifier 23 (image captured by the camera 25) in a superimposed manner on the picture of the graphic of the turning position seen from before it.

According to the guide display shown in FIG. 7(*a*), the actually captured vehicle image is displayed as being overlapped on a map picture displayed as the graphic for guidance, and an instruction of "to follow that vehicle" is given by voice guidance, etc., so that it is possible to provide a presentation on what turning point to turn left, to the user who drives the host vehicle 30 in a visually easy-to-understand manner.

As a result, under the condition where a real image of a vehicle that is the same as the preceding vehicle actually traveling ahead (actual image of a vehicle identical to that which is actually seen) is displayed on the guide display screen, the user understands that he/she only has to follow the preceding vehicle. This results in such route guidance that does not cause misunderstanding of a turning point and is very easy-to-understand.

(2) Guide Pattern 2

The route guider 13 is provided with a function of displaying, as a graphic, a view of the turning position seen from before it, and a function of displaying, as a graphic, at least a vehicle image corresponding to each vehicle type.

For the route guider 13, the guide information generator prepares and transmits thereto the preceding vehicle information including the turning position and the vehicle type and color, etc. of the preceding vehicle. Also in this case, the guide information generator 24 has received the vehicle image as the recognition result from the vehicle recognizer 22 (see, Step ST14 in FIG. 4).

Then, the route guider 13 provides a presentation to the user, on the basis of the turning position and the vehicle image of the preceding vehicle that are included in the preceding vehicle information, by displaying on the display 14, as a graphic, a view of the turning position seen from before it, and by displaying a graphic image having a feature in the vehicle type and color, etc. (at least, a feature in the vehicle type) corresponding to the preceding vehicle determined by the route identifier 23, in a superimposed manner on a picture of the graphic. This is the predetermined presentation method according to Guide Pattern 2.

FIG. 7(*b*) is a diagram showing an example of a guide display screen when a presentation is made by displaying the vehicle graphic image having a feature in the vehicle type and color, etc. corresponding to the nearby vehicle 32 that is the preceding vehicle determined by the route identifier 23, in a superimposed manner on the picture of the graphic of the turning position seen from before it.

According to the guide display shown in FIG. 7(*b*), the vehicle graphic image having a feature in the vehicle type and color, etc. of the preceding vehicle obtained by performing identification between the actually captured vehicle image and the vehicle DB, is displayed as being overlapped on a map picture displayed as the graphic for guidance, and an instruction of "to follow that vehicle" is given by voice guidance, etc., so that it is possible to provide a presentation on what turning point to turn left, to the user who drives the host vehicle 30 in a visually easy-to-understand manner.

As a result, under the condition where a graphic image of a vehicle that is the same as the preceding vehicle actually traveling ahead (graphic image of a vehicle identical to that which is actually seen) is displayed on the guide display screen, the user understands that he/she only has to follow the preceding vehicle. This results in such route guidance that does not cause misunderstanding of a turning point and is very easy-to-understand.

(3) Guide Pattern 3

The route guider 13 is provided with a function of displaying a camera image captured by the camera (image captured ahead of the host vehicle), and a function of putting a mark on a part in the displayed image.

To the route guider 13, the guide information generator 24 transmits the preceding vehicle information including the turning position, the position of the preceding vehicle in the camera image, and the camera image. Also in this case, the guide information generator 24 has received the vehicle image as the recognition result from the vehicle recognizer 22 (see, Step ST14 in FIG. 4).

Then, the route guider 13 provides a presentation to the user by displaying on the display 14, the camera image included in the precedent vehicle information (image captured ahead of the host vehicle 30), and by putting a mark on the preceding vehicle in the image. This is the predetermined presentation method according to Guide Pattern 3.

FIG. 7(*c*) is a diagram showing an example of a guide display screen when a presentation is made by putting a mark 70 only on the nearby vehicle 32 in the camera image that is the preceding vehicle determined by the route identifier.

According to the guide display screen shown in FIG. 7(*c*), the camera image actually captured by the camera 25 of the host vehicle 30 is displayed with the mark 70 put only on the nearby vehicle 32 as the preceding vehicle in the image, and an instruction of "to follow the vehicle with that mark 70" is given by voice guidance, etc., so that it is possible to provide a presentation on what turning point to turn left, to the user who drives the host vehicle 30 in a visually easy-to-understand manner.

As a result, under the condition where real images of an actually traveling road and a vehicle that is the same as the preceding vehicle traveling ahead (actual images of a road and a vehicle identical to those which are actually seen) are displayed as a guide display screen, and where the mark is displayed as being put only on the preceding vehicle in the images, the user understands that he/she only has to follow the preceding vehicle with that mark. This results in such route guidance that does not cause misunderstanding of a turning point and is very easy-to-understand.

Note that, in FIG. 7(*c*), a rectangular thick-frame is adopted as the mark 70 indicative of the precedent vehicle; however, in place of the rectangular thick-frame, another mark, such as a round frame, an arrow mark or the like, may be used.

As described above, according to Embodiment 1, at the time of performing turning guidance for a user who drives a vehicle, it is possible to perform the guidance in a way easy-to-understand for the user. Namely, a presentation of the preceding vehicle is made using an actual image or a graphic image of a vehicle that is the same as that actually seen, so that the user who drives the vehicle in traveling understands that he/she only has to follow the preceding vehicle actually traveling ahead. This results in such route guidance that does not cause misunderstanding of a turning point and is very easy-to-understand.

Embodiment 2

The block diagram showing the configuration of a navigation device according to Embodiment 2 of the invention is the same as the block diagram shown in FIG. 1 according to Embodiment 1, so that it is omitted from illustration and description.

Further, with respect to the configuration and processing, portions similar to those in Embodiment 1 are omitted from illustration and description, so that only different portions will be described.

In the navigation unit 10 according to Embodiment 2, the route guider 13 is provided with a projection function of a laser projector or the like. Specifically, a projection device such as a laser projector or the like may be coupled with the route guider 13, and such a configuration including the projection device will be referred to as the route guider 13.

The route guider 13 according to Embodiment 2 is provided with a function of projecting light to an object outside the vehicle, using the projection function of a laser projector or the like, so as to project it outwardly from the host vehicle to thereby put a projection mark.

To the route guider 13, the guide information generator 24 transmits the preceding vehicle information including the position of the preceding vehicle. In this case, the guide information generator 24 has received the vehicle image as the recognition result from the vehicle recognizer 22 (see, Step ST14 in FIG. 5 of Embodiment 1).

Then, the route guider 13 provides a presentation to the user by putting onto the preceding vehicle, the projection mark of light, etc. using a laser projector or the like, on the basis of the position of the preceding vehicle included in the preceding vehicle information. This is the predetermined presentation method according to Embodiment 2.

With respect to this, although its presentation state is omitted from illustration, the projection mark is projected onto the preceding vehicle actually traveling ahead, and an instruction of "to follow the vehicle with that projection mark" is given by voice guidance, etc., so that it is possible to provide a presentation on what turning point to turn right/left or likewise, to the user who drives the host vehicle 30 in a visually easy-to-understand manner.

As a result, under the condition where the projection mark is put on the preceding vehicle actually traveling ahead, the user understands that he/she only has to follow the preceding vehicle with that projection mark. This results in such route guidance that does not cause misunderstanding of a turning point and is very easy-to-understand.

As described above, according to Embodiment 2, at the time of performing turning guidance for a user who drives a vehicle, it is possible to perform the guidance in a way easy-to-understand for the user. Namely, a presentation of the preceding vehicle is made by putting the projection mark onto the actually-seen vehicle, so that the user who drives the vehicle in traveling understands that he/she only has to follow the preceding vehicle actually traveling ahead. This results in such route guidance that does not cause misunderstanding of a turning point and is very easy-to-understand.

It should be noted that unlimited combination of the respective embodiments, modification of any configuration element in the embodiments and omission of any configuration element in the embodiments may be made in the present invention without departing from the scope of the invention.

INDUSTRIAL APPLICABILITY

The navigation device of the invention may be applied not only as a navigation device for on-vehicle use, but also as a navigation device to be used by being carried into a vehicle, such as a portable navigation device, etc.

DESCRIPTION OF REFERENCE NUMERALS AND SIGNS

10: navigation unit, 11: position measuring unit, 12: map data storing unit, 13: route guider, 14: display, 15: voice output unit, 20: preceding-vehicle guider, 21: vehicle database (vehicle DB), 22: vehicle recognizer, 23: route identifier, 24: guide information generator, 25: camera, 30: host vehicle, 31 to 34: nearby vehicles, 40: road during travel of the host vehicle 30, 41: turning point, 42: road after turning left at the turning point 41, 50: guide route, 60: recognition region, 70: mark indicative of preceding vehicle.

The invention claimed is:

1. A navigation device which is provided with a route guider that generates route information on the basis of position information of a host vehicle and map data, to thereby perform route guidance for a user who drives the host vehicle, the route information indicating the host vehicle's route, comprising:

a route identifier that extracts a turning position of the host vehicle on the basis of the route information acquired from the route guider, to thereby prepare, as a recognition region, a predetermined range of the host vehicle's route after the turning position;

a vehicle recognizer that acquires the recognition region from the route identifier to thereby detect within the recognition region, one or more nearby vehicles with respect to the host vehicle on the basis of an image captured ahead of the host vehicle in traveling, and that informs of a vehicle trajectory and a vehicle image of the one or more nearby vehicles, as a recognition result, the route identifier determining a preceding vehicle from the one or more nearby vehicles traveling on the route that is the same as that of the host vehicle, on the basis of the recognition result acquired from the vehicle recognizer; and a guide information generator that generates preceding vehicle information for providing to the user a presentation of the preceding vehicle determined by the route identifier, wherein the route guider, at the time of performing the route guidance, provides the presentation of the preceding vehicle to the user by a predetermined presentation method, on the basis of the preceding vehicle information generated by the guide information generator.

2. A navigation device which is provided with a route guider that generates route information on the basis of position information of a host vehicle and map data, to thereby perform route guidance for a user who drives the host vehicle, comprising:

a route identifier that extracts a turning position of the host vehicle on the basis of the route information acquired from the route guider, to thereby prepare, as a recognition region, a predetermined range of route before and/or after the turning position, and that determines a preceding vehicle traveling on a route that is the same as that of the host vehicle;

a vehicle recognizer that acquires the recognition region from the route identifier to thereby detect within the recognition region, a nearby vehicle with respect to the host vehicle on the basis of an image captured ahead of the host vehicle in traveling, and that informs of a vehicle trajectory and a vehicle image of the thus-detected nearby vehicle, as a recognition result; and a guide information generator that generates preceding vehicle information for providing to the user a presentation of the preceding vehicle determined by the route identifier;

wherein the route identifier determines said preceding vehicle from the nearby vehicle traveling on the route that is the same as that of the host vehicle, on the basis of the recognition result acquired from the vehicle recognizer, wherein the route guider, at the time of performing the route guidance, provides the presentation of the preceding vehicle to the user by a predetermined presentation method, on the basis of the preceding vehicle information generated by the guide information generator, and wherein the route guider provides said presentation to the user, on the basis of the turning position and a vehicle image of the preceding vehicle that are included in the preceding vehicle information, by displaying on a display, as a graphic, a view of the turning position seen from before it, and by displaying the vehicle image about the preceding vehicle determined by the route identifier in a superimposed manner on a picture of the graphic.

3. A navigation device which is provided with a route guider that generates route information on the basis of position information of a host vehicle and map data, to thereby perform route guidance for a user who drives the host vehicle, comprising:

a route identifier that extracts a turning position of the host vehicle on the basis of the route information acquired from the route guider, to thereby prepare, as a recognition region, a predetermined range of route before and/or after the turning position, and that determines a preceding vehicle traveling on a route that is the same as that of the host vehicle;

a vehicle recognizer that acquires the recognition region from the route identifier to thereby detect within the recognition region, a nearby vehicle with respect to the host vehicle on the basis of an image captured ahead of the host vehicle in traveling, and that informs of a vehicle trajectory and a vehicle image of the thus-detected nearby vehicle, as a recognition result; and a guide information generator that generates preceding vehicle information for providing to the user a presentation of the preceding vehicle determined by the route identifier;

wherein the route identifier determines said preceding vehicle from the nearby vehicle traveling on the route that is the same as that of the host vehicle, on the basis of the recognition result acquired from the vehicle recognizer, wherein the route guider, at the time of performing the route guidance, provides the presentation of the preceding vehicle to the user by a predetermined presentation method, on the basis of the preceding vehicle information generated by the guide information generator, and wherein the route guider provides said presentation to the user, on the basis of the turning position and a vehicle image of the preceding vehicle that are included in the preceding vehicle information, by displaying on a display, as a graphic, a view of the turning position seen from before it, and by displaying a graphic image at least having a feature of a vehicle type corresponding to the preceding vehicle determined by the route identifier in a superimposed manner on a picture of the graphic.

4. The navigation device of claim 1, wherein the route guider provides said presentation by displaying on a display, the image captured ahead of the host vehicle and included in the preceding vehicle information, and by putting a mark on the preceding vehicle in the image.

5. The navigation device of claim 1, wherein the route guider provides said presentation by putting a projection mark on the preceding vehicle, on the basis of a position of the preceding vehicle included in the preceding vehicle information.

6. The navigation device of claim 1, wherein the route identifier determines a nearby vehicle that is nearest to the host vehicle among the one or more nearby vehicles, as the preceding vehicle.

* * * * *